(12) United States Patent
Levin

(10) Patent No.: US 7,843,766 B2
(45) Date of Patent: Nov. 30, 2010

(54) SYSTEMS AND METHODS FOR MONITORING TIME-DEPENDENT SUBSURFACE CHANGES

(75) Inventor: Stewart A. Levin, Centennial, CO (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 12/054,159

(22) Filed: Mar. 24, 2008

(65) Prior Publication Data

US 2009/0238041 A1 Sep. 24, 2009

(51) Int. Cl.
G01V 1/00 (2006.01)
(52) U.S. Cl. .......................................... 367/40; 367/43
(58) Field of Classification Search .............. 367/37–42
See application file for complete search history.

(56) References Cited

U.S. PATENT DOCUMENTS

| | | | | |
|---|---|---|---|---|
| 3,622,966 A | * | 11/1971 | George et al. .................. | 367/42 |
| 3,629,800 A | * | 12/1971 | Schneider ..................... | 367/24 |
| 4,253,164 A | * | 2/1981 | Hall, Jr. ........................ | 367/22 |
| 6,021,091 A | * | 2/2000 | Gaiser ........................... | 367/20 |
| 6,765,570 B1 | | 7/2004 | Cheung et al. | |
| 7,505,360 B2 | * | 3/2009 | Bisley et al. .................. | 367/24 |
| 2009/0043545 A1 | * | 2/2009 | van Manen et al. ............. | 703/2 |
| 2009/0070287 A1 | * | 3/2009 | Rouhiainen et al. ............ | 707/1 |

OTHER PUBLICATIONS

Willis et al. "Spatial orientation and distribution of reservoir fractures from scattered seismic energy", Geophysics, vol. 71, No. 5, Sep.-Oct. 2006.*
Curtis et al. "Seismic interferometry—turning noise into signal", The Leading Edge, Sep. 2006, pp. 1082-1092.*
Willis, M.E., Pearce, F., Burns, D.R., Byun, J. & Minsley, B.; Reservoir Fracture Orientation and Density From Reflected and Scattered Seismic Energy; Abstract C043; 1995; 4 pages; European Association of Geoscientists and Engineers; Houten, The Netherlands.
Willis, Mark E., Burns, Daniel R., Rao, Rama, Minsley, Burke, Toksoz, M. Nafi & Vetri, Laura; Spatial Orientation and Distribution of Reservoir Fractures From Scattered Seismic Energy; Geophysics; 2006; pp. O43-O51; vol. 71, No. 5; Society of Exploration Geophysicists; Tulsa, Oklahoma.
Artman, B; Time Domain Passive Seismic Processing at Valhall; Stanford Exploration Project Report SEP-125; 2006; pp. 1-18; vol. No. 125; Stanford University; Stanford, California .
Sneider, Roel, Wapenaar, Kees & Wegler, Ulrich; Unified Green's Function Retrieval by Cross-Correlation; Connection with Energy Principles; 2007; pp. 036103-1 to 036103-14; Phys. Rev. E, 75, 036103; American Physical Society, Ridge, New York.
Curtis, Andrew, Gerstoft, Peter, Sato, Haruo, Snieder, Roel, & Wapenaar, Kees; Seismic Interferometry-Turning Noise Into Signal; The Leading Edge; 2006; pp. 1082-1092; 25; Society of Exploration Geophysicists; Tulsa, Oklahoma.

(Continued)

Primary Examiner—Scott A Hughes
Assistant Examiner—Krystine Breier
(74) Attorney, Agent, or Firm—Crain Caton & James

(57) ABSTRACT

Systems and methods for monitoring time-dependant subsurface changes from imperfectly repeated data measurements.

17 Claims, 5 Drawing Sheets

OTHER PUBLICATIONS

Willis, Mark E., Burns, Daniel R., Rongrong, Lu & Toksov, M. Nafi; Fracture Quality From Integrating Time-Lapse VSP and Microseismic data; The Leading Edge; 2007; pp. 1198-1202; vol. No. 26; Society of Exploration Geophysicists; Tulsa, Oklahoma.

Grandi, Samantha K., Yuh, Sung, Willis, Mark E. & Toksoz, M. Nafi; Fracture Characterization From Scattered Seismic Energy; a Case Study; 74TH Annual International Meeting of SEG, Expanded Abstracts; 2006; pp. 1732-1736; vol. No. 25; Society of Exploration Geophysicists; Tulsa, Oklahoma.

Zhang, Yang, Campman, Xander, Grandi, Samantha, Chi, Shihong, Willis, Mark E., Toksoz, M. Nafi, Burns & Daniel R.; F-K Domain Characteristics of the Seismic Response of a Set of Parallel Discrete Fractures; 74th Annual International Meeting of SEG, Expanded Abstracts; 2006; pp. 1727-1731; vol. No. 25; Society of Exploration Geophysicists; Tulsa, Oklahoma.

Zhang, Yang, Chi, Shihong, Willis, Mark E., Burns, Daniel & Toksoz, M. Nafi; Comparison of Discrete Fracture and Effective Media Representation of Fractures on Azimuthal AVO; 75th Annual International Meeting of SEG, Expanded Abstracts 24, 305; 2005; pp. 305-307; vol. No. 25; Society of Exploration Geophysicists; Tulsa, Oklahoma.

Burns, Daniel R. & Toksoz, M. Nafi; Characterization of In-Situ Stress and Permeability in Fractured Reservoirs; Semi-Annual Technical Progress Report for Period May 22, 2005-Nov. 21, 2005; Mar. 16, 2006; pp. 1-62; DOE DE-FC26-02NT15346; Earth Resources Laboratory, Department of Earth, Atmospheric, and Planetary Sciences, Massachusetts Institute of Technology; Cambridge, MA.

Rao, Rama, Willis, Mark, Burns, Dan, Toksoz, M. Nafi & Vetri, Laura; Fracture Spacing and Orientation Estimation from Spectral Analyses of Azimuth Stacks; 73rd Annual International Meeting, SEG Expanded Abstracts 24, 1409; 2005; pp. 1409-1412; vol. No. 25; Society of Exploration Geophysicists; Tulsa, Oklahoma.

Landmark Graphics Corporation; ProMax® 4D; Halliburton—Drilling, Evaluation and Digital Solutions; Jan. 2007; 2 pages.

Minsely, Burke J., Willis, Mark E., Krasovec, Mary, Burns, Daniel R. & Toksoz, M. Nafi; Investigation of a Fractured Reservoir Using P-Wave AVOA Analysis; a Case Study of the Emilio Field With Support from Synthetic Examples; 72nd Annual International Meeting, SEG, Expanded Abstracts 23; 2004; pp. 248-251; vol. No. 25; Society of Exploration Geophysicists; Tulsa, Oklahoma.

Willis, Mark, Rao, Rama, Burns, Daniel, & Byun, Joongmoo; Spatial Orientation and Distribution of Reservoir Fractures from Scattered Seismic Energy; MIT Earth Resources Lab Sponsors Meeting; 2004; 9 pages; MIT; Boston, Massachusetts.

* cited by examiner

SYSTEMS AND METHODS FOR MONITORING TIME-DEPENDENT SUBSURFACE CHANGES

CROSS-REFERENCE TO RELATED APPLICATIONS

Not applicable.

STATEMENT REGARDING FEDERALLY SPONSORED RESEARCH

Not applicable.

FIELD OF THE INVENTION

The present invention generally relates to systems and methods for monitoring subsurface changes over time. More particularly, the present invention relates to monitoring time-dependent subsurface changes from imperfectly repeated data measurements.

BACKGROUND OF THE INVENTION

In the field of earth sciences, seismic sounding is used for exploring the subterranean geology of an earth formation. The acquisition of seismic data is typically accomplished by transmitting an acoustic signal into the earth and recording reflections of the signal. The layers of rock within the earth differ in their acoustic properties and these changes in properties produce different reflections of the seismic signal. Data acquisition therefore, involves energy sources generating signals propagating into the earth and reflecting from subsurface geological structures. The reflected signals are recorded by receivers on or near the surface of the earth. The reflected signals are stored as time series (pre-stack seismic traces) that consist of amplitudes of acoustic energy, which vary as a function of time, receiver position and source position. Because subsurface geological structures are different, depending on formation layers within the earth, the variation in the amplitudes of the reflected acoustic signals are indicative of the physical properties of these structures from which the signals reflect. A similar technique can be used for offshore oil and gas exploration. In either application, subsurface sedimentary structures that trap oil, such as faults and domes, are mapped by the reflective signals.

The seismic data are generally processed to create acoustic images from which data interpreters may create images of the subsurface formations. Data processing therefore, involves procedures that vary depending on the nature of the seismic data acquired and the geological structure being interpreted. A single echo (reflection) train is usually called a trace. A trace generally represents a combination of many sinusoidal waves as a function of time. The strength of the recorded reflections rises and falls over a period of several seconds, and is recorded in digital form or converted to digital form for processing and analysis. The variations in the trace generally consist of amplitude characteristics such as peaks, zero crossings and troughs.

The use of seismic data to detect subsurface change in formations by means of surface or other remote geophysical measurements made over a period of time has a long history of scientific study and commercial application. Commercial applications include, for example, monitoring i) pollutant discharge; ii) aquifer levels and breaches; iii) the effectiveness of enhanced oil recovery methods; and iv) sequestration of greenhouse gases such as carbon dioxide. In the field of petroleum exploration and production, seismic data acquired for such monitoring are often termed "time-lapse" or "4-D" seismic-data sets or surveys and may be used to monitor subsurface changes, such as expansion, contraction and fracturing, in a formation producing hydrocarbons that are induced by the extraction/injection of fluids and gases. The analysis of such changes is pertinent to determining, enhancing, and monitoring production efficiency over time.

In practice, however, the detection and analysis of changes between time-lapse seismic-data sets is impaired because it may be difficult or impossible to recreate the precise instrument positioning, earth coupling, source signature and receiver characteristics from one geophysical survey to the next. A truly repeated survey should have identical subsurface responses except where affected by actual subsurface changes. There is therefore a major commercial emphasis on improving the repeatability of field acquisition. While such approaches can indeed be effective, they are costly in time and financial resources to implement. Furthermore, extensive reprocessing of the time-lapse seismic surveys is very often needed in order to make them look as much alike as possible, leveraging the assumption that only a small portion of the subsurface will change over time. Generally, traces in each survey must be interpolated to precisely align them on a common grid and various wavelet adjustments and data warping are applied to make the data sets match.

In addition to their cost and complexity, these conventional approaches to 4-D seismic survey acquisition and analysis do not handle passive seismic monitoring wherein sources are not used and receivers are simply positioned above or around the reservoir and continuously record naturally occurring seismic energy. Such passive data presents two major obstacles to analysis: i) the energy source is inherently non-repeatable; and ii) the seismic energy reflected from the reservoir during the continuous recording does not arrive separated either in time or space from energy reflected from strata above or below the reservoir. The latter issue is addressed in the field of seismic interferometry with published techniques such as those described by Artman, 2006, *Time domain passive seismic processing at Valhall* (Stanford Exploration Project Report SEP-125, p. 1-18); by Sneider, Wapenaar and Weler, 2007, *Unified Green's function retrieval by cross-correlation; connection with energy principles* (Phys. Rev. E, 75, 036103); and by Curtis, et al., 2006, *Seismic interferometry—turning noise into signal* (The Leading Edge, 25, 1082-1092) wherein passive seismic data are transformed into active source seismograms, albeit with little or no control on the signatures of these effective sources.

While development of 4-D seismic technology and techniques has been ongoing for a couple of decades, it is clearly desirable to devise a novel approach that i) relaxes, rather than tightens, the field acquisition and data processing requirements of current 4-D methodologies; and ii) can be applied to passive seismic monitoring as well as time-lapse active source seismic surveys.

To this end, two concepts may be exploited. First, the distribution of time-lapse changes in and around a reservoir are spatially coherent, i.e. changes in the strata have a real extent. As a consequence, if there are one or more measures of the reservoir interval that are both sensitive to the contents of the reservoir and have a consistent calibration across multiple time-lapse surveys, then they can be a really mapped, i.e. spatially interpolated to a uniform grid for each survey, independently, and the gridded measure(s) can then be compared. As computerized mapping is very quick and easy with present-day commercial software packages, the time and cost of generating such maps is far less than that of conventional high precision field acquisition and data processing of 4-D seismic surveys.

The second concept is that time-lapse changes in a reservoir could be measured by comparing relative changes within each trace rather than absolute differences between each trace in the surveys. Conventional state-of-the-art methodology strives to generate seismic traces that look exactly alike over regions without subsurface change so that trace-by-trace subtraction (Trace(T=2,X)−Trace(T=1,X)) will produce non-zero differences in those zones that have changed. Even small variations in source signature, receiver instrument response and shallow near-surface effects between the traces being subtracted may render the result uninterpretable. One measure of relative change within a trace is described by M. E. Willis in *Spatial orientation and distribution of reservoir fractures from scattered seismic energy* (Geophysics, 71(5), O43-O51) (hereinafter Willis), which is incorporated herein by reference. In Willis, traces recorded at different azimuths around a common location are analyzed by selecting a window of seismic samples above a suspected fracture zone and another window below that zone, computing auto-correlations of each window and then designing a transfer function to convert the upper auto-correlation to the lower auto-correlation. The transfer function essentially represents a spectral ratio between the window above the suspected fracture zone and the window below that zone. Thus wavelet effects common to the two windows, specifically source signature, receiver instrument response and shallow near-surface effects, are effectively cancelled out in the ratio. As wavelet repeatability is a central obstacle to time-lapse seismic survey matching, the transfer functions of Willis are especially suited to the challenges of time-lapse seismic monitoring.

SUMMARY

The present invention overcomes one or more deficiencies in the prior art by providing systems and methods for monitoring time-dependent subsurface changes.

In one embodiment, the present invention includes a method for monitoring time-dependent subsurface changes between a data set and another data set, which comprises: i) extracting a first window of data from each data set, each first window corresponding to a region above a known or suspected area of change in the data set; ii) extracting a second window of data from each data set, each second window corresponding to a region below the known or suspected area of change in the data set; iii) forming a first auto-correlation of each first window and a second auto-correlation of each second window; iv) computing a shaping filter for each data set, which transforms the first auto-correlation of each first window to the second auto-correlation of each respective second window; v) computing a transfer function on a computer system that transforms the shaping filter of the data set to the shaping filter of the another data set; and vi) rendering an image of at least one of the shaping filters for each data set and the transfer function in spatially coincident alignment.

In another embodiment, the present invention includes a program carrier device for carrying computer executable instructions for monitoring time-dependent subsurface changes between a data set and another data set, the instructions being executable to implement: i) extracting a first window of data from each data set, each first window corresponding to a region above a known or suspected area of change in the data set; ii) extracting a second window of data from each data set each second window corresponding to a region below the known or suspected area of change in the data set; iii) forming a first auto-correlation of each first window and a second auto-correlation of each second window; iv) computing a shaping filter for each data set, which transforms the first auto-correlation of each first window to the second auto-correlation of each respective second window; v) computing a transfer function that transforms the shaping filter of the data set to the shaping filter of the another data set; and vi) rendering an image of at least one of the shaping filters for each data set and the transfer function in spatially coincident alignment.

In yet another embodiment, the present invention includes a program carrier device having a data structure stored thereon, the data structure comprising: i) a first data field comprising a shaping filter for a data set, the data set representing a subsurface location and time; ii) a second data field comprising another shaping filter for another data set, the another data set representing the subsurface location and another time; iii) a third data field, the third data field comprising a transfer function representing a transformation of the shaping filter of the data set to the shaping filter of the another data set, wherein the first data field, the second data field and the third data field are aligned so that the shaping filter, the another shaping filter and the transfer function are spatially coincident.

Additional aspects, advantages and embodiments of the invention will become apparent to those skilled in the art from the following description of the various embodiments and related drawings.

BRIEF DESCRIPTION OF THE DRAWINGS

The present invention will be described with reference to the accompanying drawings in which like elements are referenced with like reference numerals, and in which.

DETAILED DESCRIPTION OF THE PREFERRED EMBODIMENTS

The subject matter of the present invention is described with reference to certain preferred embodiments however, is not intended to limit the scope of the invention. The claimed subject matter thus, might also be embodied in other ways to include different steps, or combinations of steps, similar to the ones described herein and other technologies. Although the term "step" may be used herein to describe different elements of methods employed, the term should not be interpreted as implying any particular order among or between various steps herein disclosed unless otherwise expressly limited by the description to a particular order.

In one embodiment, the present invention may be described in the general context of a computer-executable program of instructions, such as program modules, generally referred to as software. The software may include, for example, routines, programs, objects, components, data structures, etc., that perform particular tasks or implement particular abstract data types. The software forms an interface to allow a computer to react according to a source of input. The software may also cooperate with other code segments to initiate a variety of tasks in response to data received in conjunction with the source of the received data. The software may be stored and carried on any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire, free space and/or through any of a variety of networks such as the internet.

Those skilled in the art will appreciate that the present invention may be implemented in a variety of computer-system configurations including hand-held devices, multi-processor systems, microprocessor-based or programmable-consumer electronics, minicomputers, mainframe computers and the like. Any number of computer-systems and computer networks are therefore, acceptable for use with the present invention. The present invention may be practiced in distributed-computing environments where tasks are performed by remote-processing devices that are linked through a communications network. In a distributed-computing environment, the software may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may therefore, be implemented using hardware, software or a combination thereof, in a computer system or other processing system.

Figure 1:
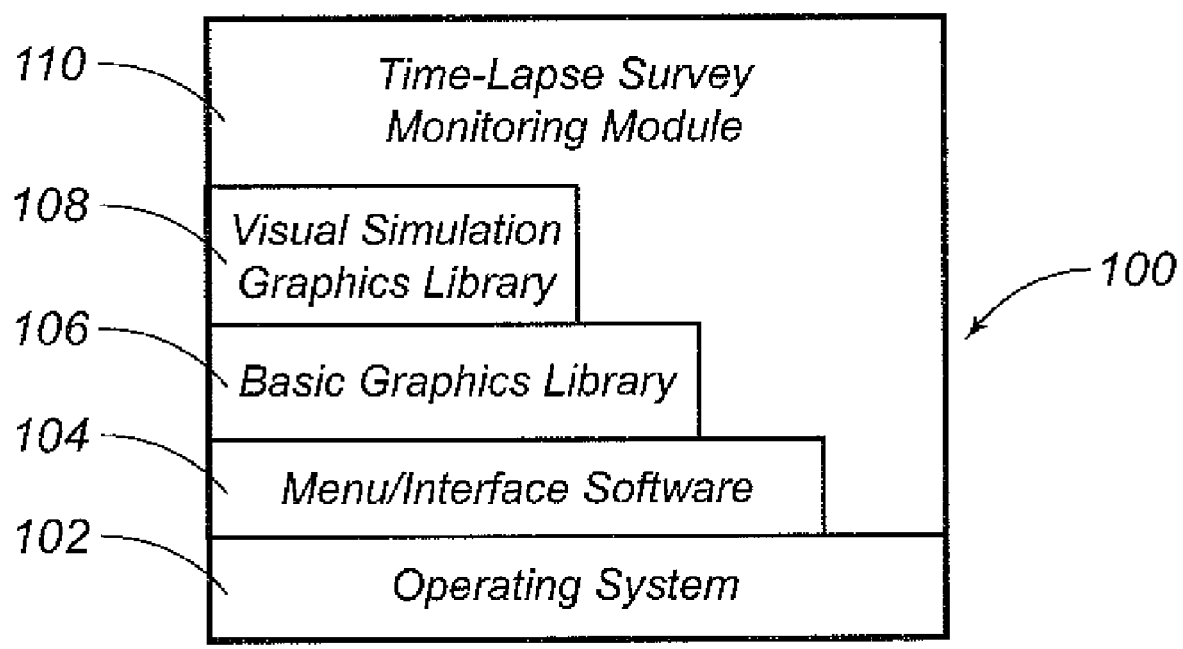
FIG. 1 is a block diagram illustrating one embodiment of a software program for implementing the present invention on a computer system.

FIG. 1 is a block diagram illustrating one embodiment of a software program 100 for implementing the present invention. At the base of the program 100 is an operating system 102. A suitable operating system 102 may include, for example, a Windows X operating system from Microsoft Corporation, or other operating systems as would be apparent to one of skill in the relevant art.

Menu/interface software 104 overlays the operating system 102. The menu/interface software 104 are used to provide various menus and windows to facilitate interaction with the user, and to obtain user input and instructions. As would be readily apparent to one of skill in the relevant art, any number of menu/interface software programs could be used in conjunction with the present invention.

A basic graphics library 106 overlays menu/interface software 104. Basic graphics library 106 is an application programming interface (API) for three-dimensional computer graphics. The functions performed by basic graphics library 106 may include, for example, geometric and raster primitives, RGBA or color index mode, display list or immediate mode, viewing and modeling transformations, lighting and shading, hidden surface removal, alpha blending (translucency), anti-aliasing, texture mapping, atmospheric effects (fog, smoke, haze), feedback and selection, stencil planes and accumulation buffer.

A visual simulation graphics library 108 overlays the basic graphics library 106. The visual simulation graphics library 108 is an API for creating multi-processed visual simulation graphics applications. As will be understood by those skilled in the art, the visual simulation graphics library 108 may include a suite of tools for processing two-dimensional and/or three-dimensional seismic data. The visual simulation graphics library 108 therefore, provides functions that bundle together graphics library state control functions such as lighting, materials, texture, and transparency. These functions track state and the creation of display lists that can be rendered later.

A time-lapse survey monitoring module 110 overlays the other elements of program 100, which interfaces with, and utilizes the functions carried out by, the visual simulation graphics library 108, the basic graphics library 106, the menu/interface software 104 and the operating system 102. The monitoring module 110, visual simulation graphics library 108, basic graphics library 106, menu/interface software 104 and operating system 102 are executed on one or more general purpose CPU's such as, for example, processors marketed by Intel® and AMD®. The monitoring module 110 may be written in an object-oriented programming language such as, for example, C++ to allow the creation and use of objects and object functionality. SeisSpace® and ProMax®, which are commercial-software packages marketed by Landmark Graphics Corporation for use in the oil and gas industry, are examples of appropriate applications for implementation and application of the monitoring module 110. Exemplary methods enabled by the monitoring module 110 are further described in reference to FIG. 2.

The present invention is described with reference to processing traces, which may represent a two-dimensional or a three-dimensional time-lapse survey of a subsurface region. Although the display of such data, according to the present invention, is described with reference to a two-dimensional image, the display may also include a three-dimensional image. Geoprobe®, which is another commercial-software package marketed by Landmark Graphics Corporation for use in the oil and gas industry, is an example of an appropriate interface application that may be used to render a three-dimensional image of the traces in real-time for interactive evaluation and interpretation. The requirements for GeoProbe® are further described in U.S. Pat. No. 6,765,570, which is assigned to Landmark Graphics Corporation and incorporated herein by reference.

The program 100 illustrated in FIG. 1 may be executed or implemented through the use of a computer system incorporating the program 100 and various hardware components. The system hardware components may include, for example, a processor, memory (e.g., random access memory and/or non-volatile memory devices), one or more input devices, one or more display devices, and one or more interface devices. These hardware components may be interconnected according to a variety of configurations and may include one or more GPU's and CPU's configured in the manner described in the '570 Patent. Non-volatile memory devices may include, for example, devices such as tape drives, semiconductor ROM or EEPROM. Input devices may include, for example, devices such as a keyboard, a mouse, a digitizing pad, a track ball, a touch-sensitive pad and/or a light pen. Display devices may include, for example, devices such as monitors, projectors and/or head-mounted displays. Interface devices may be configured to require digital image data from one or more acquisition devices and/or from one or more remote computers or storage devices through a network. Any variety of acquisition devices may be used depending on the type of object being imaged. The acquisition device(s) may sense various forms of mechanical energy (e.g., acoustic (seismic) energy, displacement and/or stress/strain). Other well known computer system configurations and components that may be used to execute the program 100 are described in the '570 Patent.

Each processor may be configured to reprogram instructions and/or data from RAM and/or non-volatile memory devices, and to store computational results into RAM and/or non-volatile memory devices. The program 100 directs each processor to operate on a three-dimensional volume of traces and other two-dimensional or three-dimensional seismic-data sets based on the methods described herein.

Figure 2:
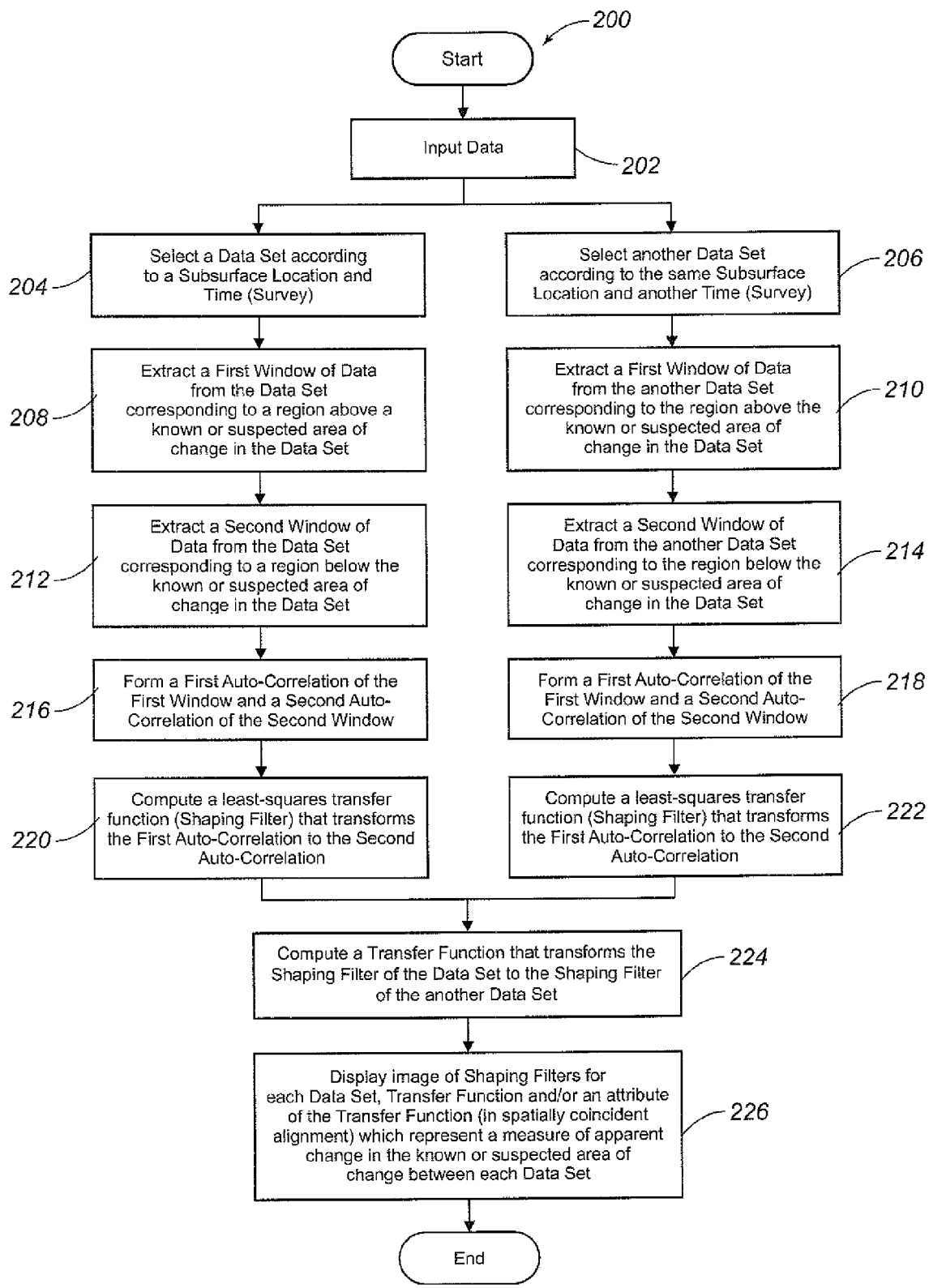
FIG. 2 is a flow diagram illustrating one embodiment of a method for implementing the present invention.
Figure 3:
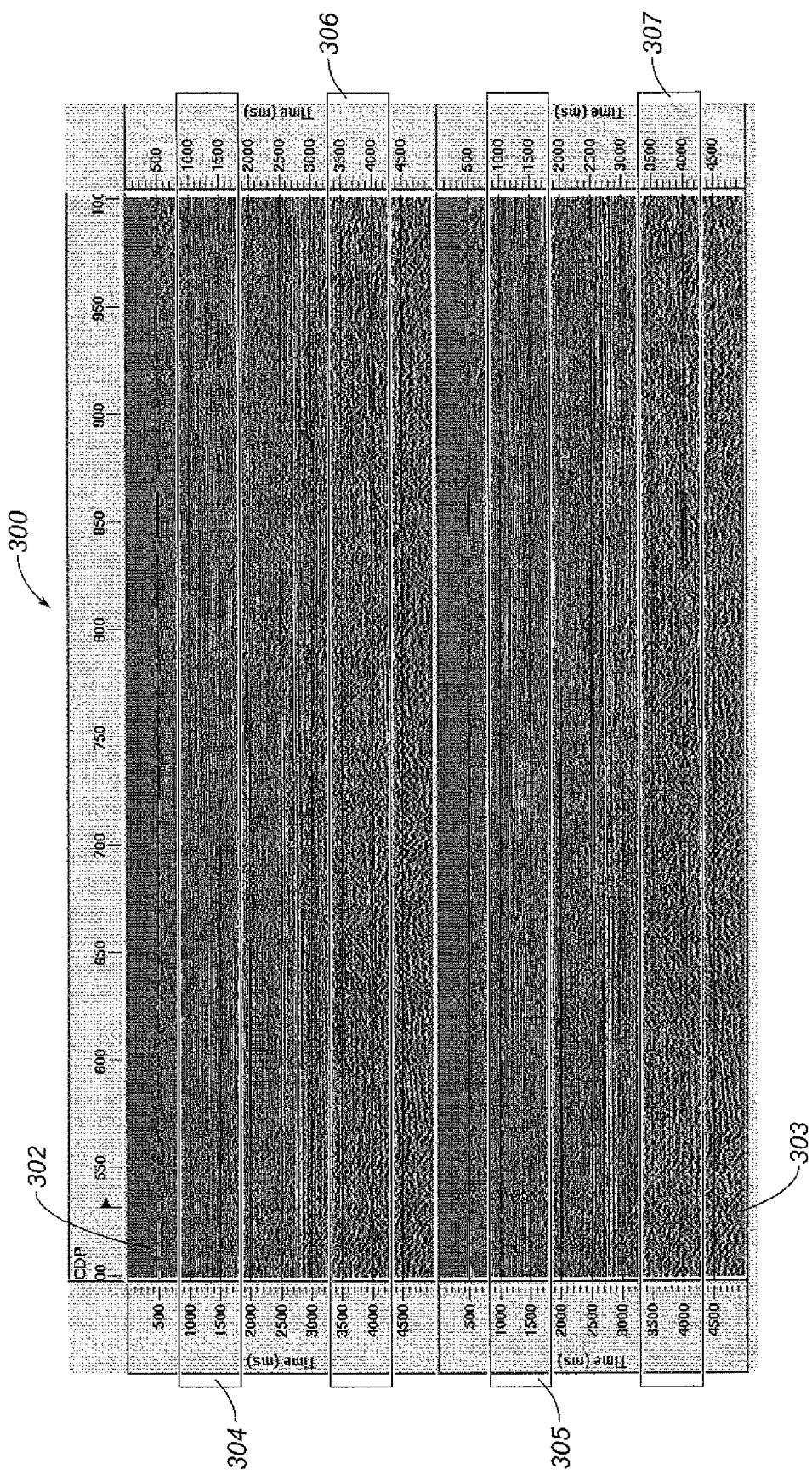
FIG. 3 is a plotted display of seismic data from two separate surveys of the same subsurface location at different times, which are spatially coincident.

Referring now to FIG. 2, a flow diagram generally illustrates one embodiment of a method 200 for implementing the present invention. The method begins at step 202 with the input of time-lapse data from a data source using input devices and the graphical user interface tools (menu/interface software 104) described in reference to FIG. 1. The data may include, for example, processed or unprocessed seismic data but may also include other types of data such as, for example, data derived from electromagnetic, aero-magnetic and radar measurements of the earth or human body. The input data may be retrieved directly from the CPU or from some other memory or storage medium within the CPU. The input data may be provided to the computer system through a variety of mechanisms. For example, the input data may be acquired into non-volatile memory and/or RAM using one or more interface devices. As another example, the input data may be supplied to the computer system through a memory medium such as a disc or a tape which is loaded into or onto one of the non-volatile memory devices. In this case, the input data will have been previously recorded onto the memory medium. It is noted that the input data may not necessarily be raw sensor data obtained by an acquisition device. For example, the input data may be the result of one or more processing operations using a set of raw sensor data. The processing operation(s) may be performed by the computer system and/or one or more other computers. The input data may be stored in a format generally well known in the art and/or described in '570 Patent.

If the input data at step 202 is in the form of passive seismic recordings, the source of the seismic energy being recorded may be unconstrained ambient noise. In this event, well-known methods using interferometry, such as those described herein, may be used to convert the passive seismic data into active source seismograms, which may be processed by the method 200 as input data.

Referring now to FIGS. 2-5, the remainder of the method 200 will be illustrated using 4D active-seismic data as the input data at step 202.

In step 204, a data set 302 is selected using input devices and the graphical user interface tools (menu/interface software 104) described in reference to FIG. 1 according to a subsurface location and time, which is commonly referred to in the oil and gas industry as a time-lapse seismic-data survey. In step 206, another data set 303 is selected using input devices and the graphical user interface tools (menu/interface software 104) described in reference to FIG. 1 according to the same subsurface location and another time (survey). As illustrated by the display 300 in FIG. 3, the data set 302 and the another data set 303 are plotted according to reflection arrival time (milliseconds) and a surface location halfway between the source and a receiver, typically referred to as the common depth point ("CDP"). The display 300 illustrates that the data set 302 is positioned above, and is aligned with, the another data set 303, meaning they are spatially coincident. While the differences are subtle, the two data sets (surveys) have wavelets that are about 40 degrees out of phase. The second data set also includes a zone of attenuation, which represents the accumulation of gaseous hydrocarbons from production operations between CDP locations 625 and 675 in the subsurface interval between 2400 and 2500 ms.

In step 208, a first window of data 304 is extracted from the data set 302 using input devices and the graphical user interface tools (menu/interface software 104) described in reference to FIG. 1. The first window of data 304 corresponds to a region above a known or suspected area of change in the data set 302. In step 210, a first window of data 305 is extracted from the another data set 303 using input devices and the graphical user interface tools (menu/interface software 104) described in reference to FIG. 1. The first window of data 305 also corresponds to the region above the known or suspected area of change in the data set 302.

In step 212, a second window of data 306 is extracted from the data set 302 using input devices and the graphical user interface tools (menu/interface software 104) described in reference to FIG. 1. The second window of data 306 corresponds to a region below the know or suspected area of change in the data set 302. In step 214, a second window of data 307 is extracted from the another data set 303 using input devices and the graphical user interface tools (menu/interface software 104) described in reference to FIG. 1. The second window of data 307 also corresponds to the region below the known or suspected area of change in the data set 302. Each first window 304, 305 corresponds with the same subsurface interval between 800 and 1800 ms. Each second window 306, 307 corresponds with the same subsurface interval between 3300 and 4300 ms. Thus, the known or suspected area of change is found in the subsurface interval between 1800 and 3300 ms.

In step 216, a first auto-correlation of the first window of data 304 and a second auto-correlation of the second window of data 306 are formed for the data set 302. In step 218, a first auto-correlation of the first window of data 305 and a second auto-correlation of the second window of data 307 are formed for the another data set 303. Each auto-correlation is formed by techniques well known in the art such as, for example, the techniques described by Willis.

In step 220, a least squares transfer function (shaping filter) 402 is computed that transforms the first auto-correlation of the data set 302 to the second auto-correlation of the data set 302. In step 222, a least squares transfer function (shaping filter) 403 is computed that transforms the first auto-correlation of the another data set 303 to the second auto-correlation of the another data set 303. Each shaping filter is computed by techniques well know in the art such as, for example, the techniques described by Willis. As illustrated by the display 400 in FIG. 4, each shaping filter 402, 403 is plotted according to time (milliseconds) and CDP. The display 400 illustrates that the shaping filter 402 for the data set 302 is positioned above, and is aligned with, the shaping filter 403 for the data set 303, meaning they are spatially coincident.

In step 224, a transfer function 404 is computed that transforms the shaping filter 402 of the data set 302 to the shaping filter 403 of the another data set 303. Again, the transfer function 404 may be computed by techniques well known in the art such as, for example, the techniques described by Willis. Upon completion of step 220 and 222 or 224, the method 200 may be repeated from step 208 after selecting a third data set according to the same subsurface location and a third time or by selecting a third data set according to another subsurface location and the time or the another time. By selecting a third data set according to the same subsurface location and a third time and repeating the method 200 from step 208, more time-lapse measurements may be analyzed for detecting incremental subsurface changes. By selecting a third data set according to another subsurface location and the time or the another time and repeating the method from step 208, more measurements may be analyzed over different adjacent subsurface locations for displaying a three-dimensional image.

Figure 4:
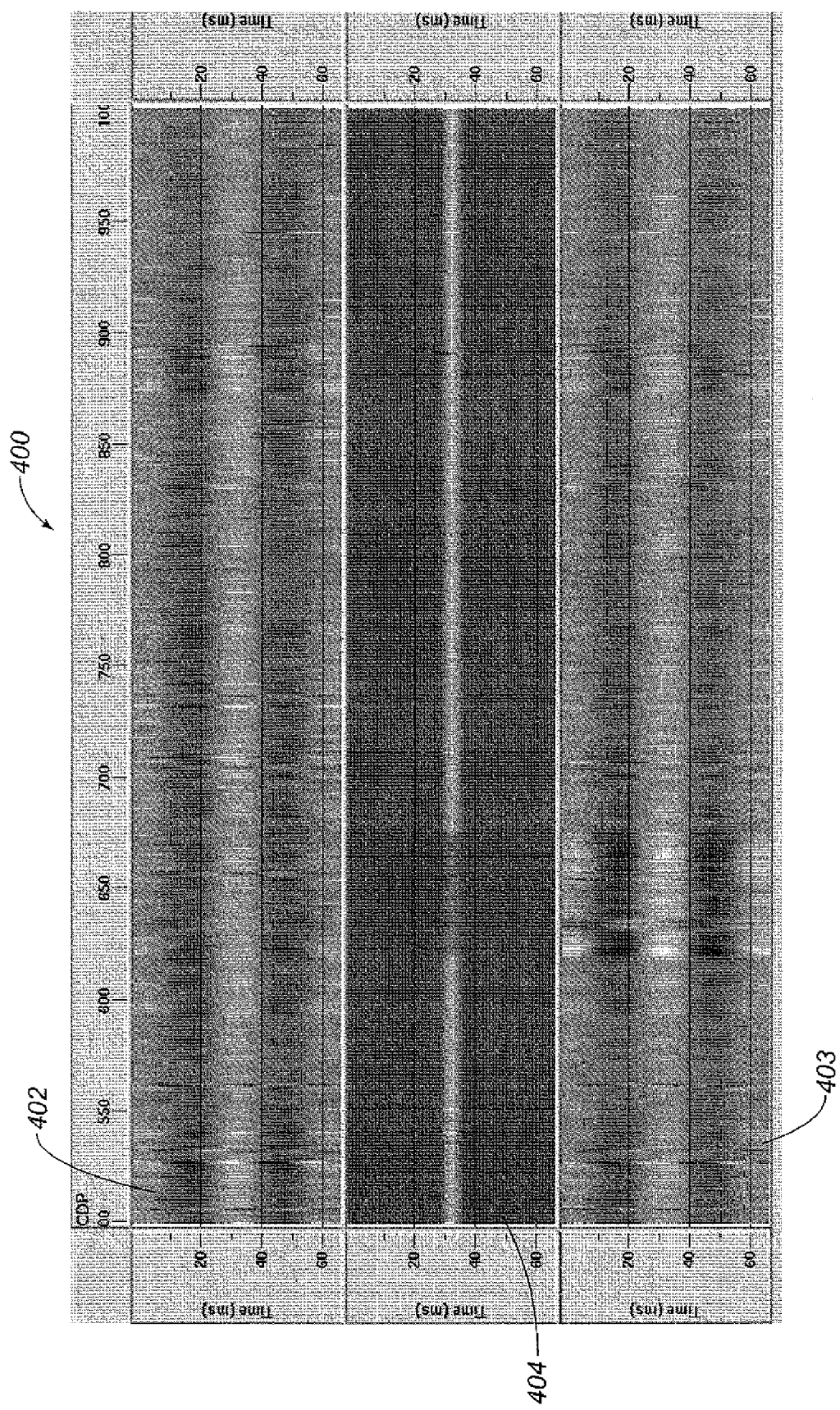
FIG. 4 is a plotted display of the shaping filters for each survey in FIG. 3 and a transfer function, which are spatially coincident.
Figure 5:
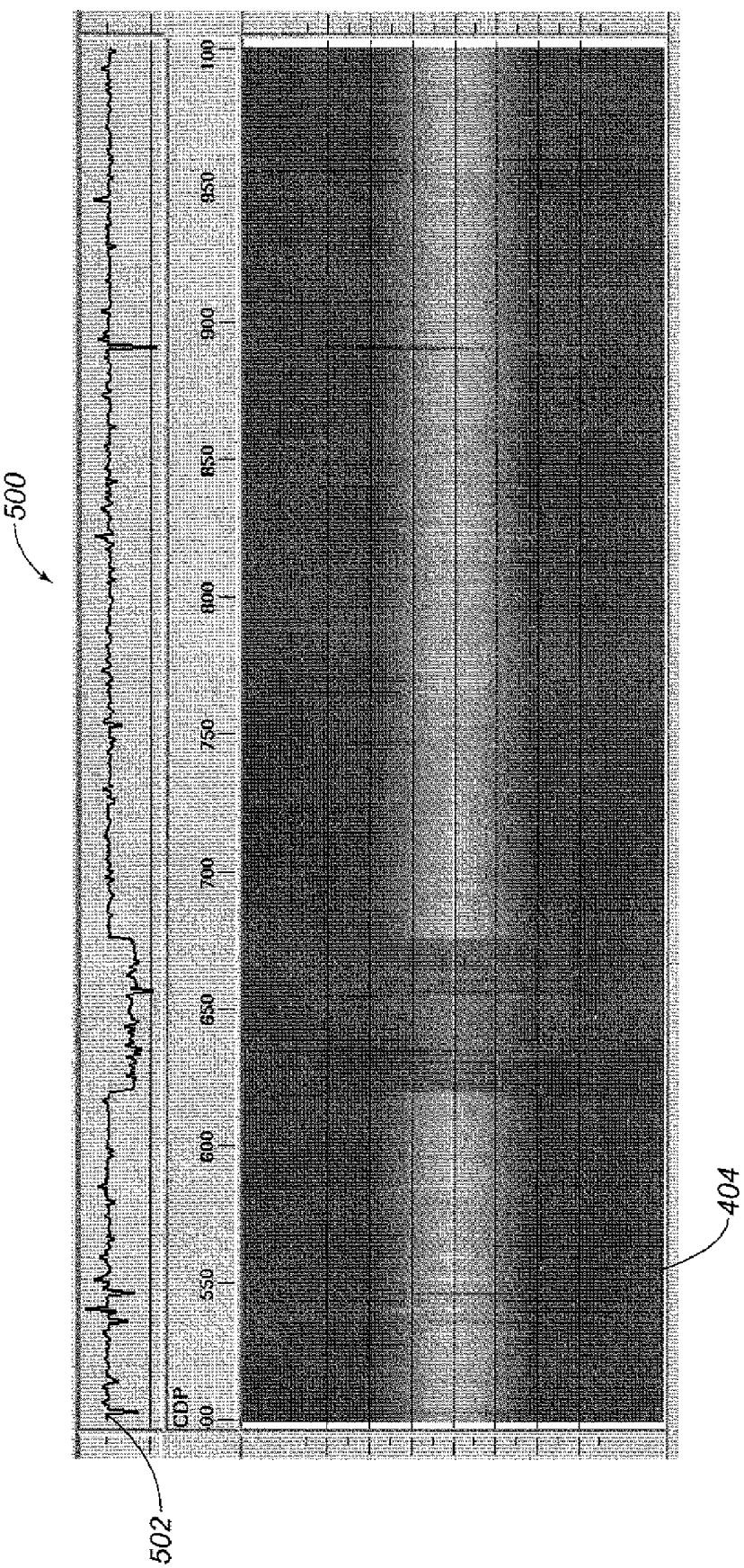
FIG. 5 is an enlarged image of the transfer function in FIG. 4 and includes an attribute (amplitude) of the transfer function, which are spatially coincident.

In step 226, an image of the shaping filters 402, 403 and the transfer function 404 are displayed by techniques well known in the art. The display 400 in FIG. 4 is an exemplary two-dimensional image resulting from step 226. As illustrated by the display 400 in FIG. 4, the transfer function 404 may be positioned between, and aligned with, each shaping filter 402, 403, meaning it is spatially coincident with each shaping filter 402, 403. Optionally, the transfer function 404 may be displayed in spatially coincident alignment with an attribute 502 of the transfer function 404 as illustrated by the display 500 in FIG. 5. In FIG. 5, the display 500 illustrates an enlarged image of the transfer function 404 in FIG. 4. The attribute 502 represents the amplitude of the center sample of the shaping filters 402, 403 of each data set 302, 303 and is plotted, with the transfer function 404, according to time (milliseconds) and CDP.

In FIG. 4 and/or in FIG. 5, the known or suspected area of change in the data set 302 is confirmed by a visual comparison of the shaping filters 402, 403 between CDP locations 625 and 675. A quick visual analysis of the transfer function 404 in FIG. 4 and in FIG. 5 highlights this change between the same CDP locations (625 and 675) and represents a measure of apparent change in the known or suspected area of change between each data set 302, 303. If there are no changes between each data set 302, 303, then, after limiting the comparison to a common signal bandwidth, the shaping filters 402, 403 for each respective data set 302, 303 will not change. Conversely, if there have been significant changes between each data set 302, 303, then the shaping filter 402 for the data set 302 will change as compared to the shaping filter 403 for the data set 303 and that change will in turn be reflected in the transfer function 404.

The present invention therefore, provides a "quick look" option that allows initial inspection and interpretation of the time-lapse differences prior to, or during, more intensive processing efforts, which is advantageous to match and analyze repeated surveys without having to match each trace between surveys. By measuring and displaying suitable attributes of the transfer functions in their proper spatial locations, the present invention quickly provides 2D maps or 3D volumes highlighting areas of time-lapse differences. An additional advantage of such displays is that they will generally reflect spatial consistency because the underlying geology has a significant statistical degree of spatial consistency, which allows for useful analysis and interpretation without the need for highly precise repetition or reconstruction of the geographic placement of field instrumentation and the multiple recordings.

The transfer function, being a ratio of above-to-below response, cancels the wavelet on the trace, at least within its effective bandwidth, measuring) instead, a characteristic of the underlying reflectivity. Where there have been no changes in the subsurface seismic data, the underlying reflectivity is unperturbed over the lapse of time and therefore, the transfer function remains the same. Conversely, where the transfer function has changed significantly between repeated surveys, it is probably due to a true change in the subsurface seismic data and not an artifact of source wavelet differences. This makes the present invention well suited to early application in the 4D monitoring analysis, providing useful information long before the full-scale matching reprocessing is completed. In addition, it can be used to feedback information to the reprocessing, helping both the processor and the interpreter to make better decisions. The present invention may also be applied to 4D passive seismic data because the shaping filters are created by spectral division, with the source wavelet appearing both in the numerator and denominator and thus, cancelling out to leave an "earth response" of the reservoir zone. If the earth response changes over time, it is indicative of changes in the reservoir itself rather than differences to random and/or systematic variations in the uncontrolled source and overburden effects in passive seismic recordings.

The present invention therefore, improves the ability to detect and monitor changes between time-lapse measurements of data, and other attribute anomalies, which are indicative of subsurface changes. Because the systems and methods described herein may be used to selectively and interactively analyze various types of data, they may be particularly useful for analyzing medical data or geophysical data, however, may also find utility for analyzing and interpreting any other type of waveform data. Applications in the oil and gas industry may include, for example, the detection and monitoring of subsurface fractures for improving production efficiency and/or sequestration of carbon dioxide.

While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof.

The invention claimed is:

1. A method for monitoring time-dependent subsurface changes between a data set and another data set, which comprises:
   extracting a first window of data from each data set, each first window corresponding to a region above a known or suspected area of change in the data set;
   extracting a second window of data from each data set, each second window corresponding to a region below the known or suspected area of change in the data set;
   forming a first auto-correlation of each first window and a second auto-correlation of each second window;
   computing a shaping filter for each data set, which transforms the first auto-correlation of each first window to the second auto-correlation of each respective second window;
   computing a transfer function on a computer system that transforms the shaping filter of the data set to the shaping filter of the another data set; and
   rendering an image of at least one of the shaping filters for each data set and the transfer function in spatially coincident alignment.

2. The method of claim 1, further comprising:
   selecting the data set according to a subsurface location and time; and
   selecting the another data set according to the subsurface location and another time.

3. The method of claim 2, further comprising:
   selecting a third data set according to the subsurface location and a third time;
   extracting a first window of data from the third data set, which corresponds to the region above the known or suspected area of change in the data set;
   extracting a second window of data from the third data set, which corresponds to the region below the know or suspected area of change in the data set;
   forming a first auto-correlation of the first window of data from the third data set and a second auto-correlation of the second window of data from the third data set;
   computing a shaping filter for the third data set that transforms the first auto-correlation of the first window of data from the third data set to the second auto-correlation of the second window of data from the third data set; and computing another transfer function that transforms the shaping filter of the data set and the shaping filter of the another data set to the shaping filter of the third data set.

4. The method of claim 2, further comprising:

selecting a third data set according to another subsurface location and the time or the another time;

extracting a first window of data from the third data set, which corresponds to the region above the known or suspected area of change in the data set;

extracting a second window of data from the third data set, which corresponds to the region below the know or suspected area of change in the data set;

forming a first auto-correlation of the first window of data from the third data set and a second auto-correlation of the second window of data from the third data set;

computing a shaping filter for the third data set that transforms the first auto-correlation of the first window of data from the third data set to the second auto-correlation of the second window of data from the third data set; and computing another transfer function that transforms the shaping filter of the data set and the shaping filter of the another data set to the shaping filter of the third data set.

5. The method of claim 1, further comprising rendering an image of an attribute of the transfer function and the transfer function in spatially coincident alignment.

6. The method of claim 1, wherein the data set and the another data set comprise active-seismic data.

7. The method of claim 1, wherein the data set and the another data set comprise active-seismic data obtained by interferometric processing of passive-seismic data.

8. The method of claim 1, wherein the data set and the another data set comprise data derived from electromagnetic, aero-magnetic or radar measurements of earth or a human body.

9. A program carrier device for carrying computer executable instructions for monitoring time-dependent subsurface changes between a data set and another data set, the instructions being executable to implement:

extracting a first window of data from each data set, each first window corresponding to a region above a known or suspected area of change in the data set;

extracting a second window of data from each data set, each second window corresponding to a region below the known or suspected area of change in the data set;

forming a first auto-correlation of each first window and a second auto-correlation of each second window;

computing a shaping filter for each data set, which transforms the first auto-correlation of each first window to the second auto-correlation of each respective second window;

computing a transfer function that transforms the shaping filter of the data set to the shaping filter of the another data set; and rendering an image of at least one of the shaping filters for each data set and the transfer function in spatially coincident alignment.

10. The program carrier device of claim 9, further comprising:

selecting the data set according to a subsurface location and time; and selecting the another data set according to the subsurface location and another time.

11. The program carrier device of claim 10, further comprising:

selecting a third data set according to the subsurface location and a third time;

extracting a first window of data from the third data set, which corresponds to the region above the known or suspected area of change in the data set;

extracting a second window of data from the third data set, which corresponds to the region below the know or suspected area of change in the data set;

forming a first auto-correlation of the first window of data from the third data set and a second auto-correlation of the second window of data from the third data set;

computing a shaping filter for the third data set that transforms the first auto-correlation of the first window of data from the third data set to the second auto-correlation of the second window of data from the third data set; and computing another transfer function that transforms the shaping filter of the data set and the shaping filter of the another data set to the shaping filter of the third data set.

12. The program carrier device of claim 10, further comprising:

selecting a third data set according to another subsurface location and the time or the another time;

extracting a first window of data from the third data set, which corresponds to the region above the known or suspected area of change in the data set;

extracting a second window of data from the third data set, which corresponds to the region below the know or suspected area of change in the data set;

forming a first auto-correlation of the first window of data from the third data set and a second auto-correlation of the second window of data from the third data set;

computing a shaping filter for the third data set that transforms the first auto-correlation of the first window of data from the third data set to the second auto-correlation of the second window of data from the third data set; and computing another transfer function that transforms the shaping filter of the data set and the shaping filter of the another data set to the shaping filter of the third data set.

13. The program carrier device of claim 9, further comprising rendering an image of an attribute of the transfer function and the transfer function in spatially coincident alignment.

14. The program carrier device of claim 9, wherein the data set and the another data set comprise active-seismic data.

15. The program carrier device of claim 9, wherein the data set and the another data set comprise active-seismic data obtained by interferometric processing of passive-seismic data.

16. The program carrier device of claim 9, wherein the data set and the another data set comprise data derived from electromagnetic, aero-magnetic or radar measurements of earth or a human body.

17. A program carrier device having a data structure stored thereon, the data structure comprising:

a first data field comprising a shaping filter for a data set, the data set representing a subsurface location and time;

a second data field comprising another shaping filter for another data set, the another data set representing the subsurface location and another time;

a third data field, the third data field comprising a transfer function representing a transformation of the shaping filter of the data set to the shaping filter of the another data set, wherein the first data field, the second data field and the third data field are aligned so that the shaping filter, the another shaping filter and the transfer function are spatially coincident; and a fourth data field comprising an attribute of the transfer function, wherein the third data field and the fourth data field are aligned so that the transfer function and the attribute of the transfer function are spatially coincident.

* * * * *

UNITED STATES PATENT AND TRADEMARK OFFICE
CERTIFICATE OF CORRECTION

| | | |
|---|---|---|
| PATENT NO. | : 7,843,766 B2 | Page 1 of 1 |
| APPLICATION NO. | : 12/054159 | |
| DATED | : November 30, 2010 | |
| INVENTOR(S) | : Stewart A. Levin | |

It is certified that error appears in the above-identified patent and that said Letters Patent is hereby corrected as shown below:

In Column 5, Line 40
Replace the words "Windows X operating system" with the words --Windows ® operating system--.

In Column 10, Line 61
Replace the word "know" with the word --known--.

In Column 11, Line 14
Replace the word "know" with the word --known--.

In Column 12, Line 9
Replace the word "know" with the word --known--.

In Column 12, Line 30
Replace the word "know" with the word --known--.

Signed and Sealed this
Twenty-sixth Day of April, 2011

David J. Kappos
*Director of the United States Patent and Trademark Office*